United States Patent [19]
Woodcock

[11] Patent Number: 5,749,474
[45] Date of Patent: May 12, 1998

[54] BICYCLE DISPLAY RACK

[76] Inventor: Timothy P. Woodcock, 2 Arundel Road, Winnipeg, Manitoba, Canada, R2J 2K9

[21] Appl. No.: 532,526

[22] Filed: Sep. 22, 1995

[51] Int. Cl.$^6$ .................................................. A47F 7/00
[52] U.S. Cl. ............................ 211/18; 211/19; 211/96
[58] Field of Search ............................ 211/17, 18, 19, 211/20, 21, 22, 47, 48, 96, 97, 168, 169

[56] References Cited

U.S. PATENT DOCUMENTS

| | | | |
|---|---|---|---|
| 614,432 | 11/1898 | Austin | 211/20 X |
| 639,991 | 12/1899 | Jewell | 211/19 X |
| 3,200,958 | 8/1965 | Hudgeons et al. | 211/169 X |
| 3,883,002 | 5/1975 | Moore | 211/18 |

FOREIGN PATENT DOCUMENTS

| | | | |
|---|---|---|---|
| 151000 | 4/1953 | Australia | 211/22 |
| 108915 | 3/1900 | Germany | 211/18 |
| 497700 | 4/1930 | Germany | 211/19 |
| 868858 | 1/1953 | Germany | 211/20 |
| 2909028 | 9/1980 | Germany | 211/47 |
| 116029 | 3/1946 | Sweden | 211/19 |
| 18355 | of 1899 | United Kingdom | 211/18 |

*Primary Examiner*—Ramon O. Ramirez
*Assistant Examiner*—Stephen S. Wentsler
*Attorney, Agent, or Firm*—Adrian D. Battison; Murray E. Thrift

[57] ABSTRACT

A bicycle rack for displaying bicycles in a retail situation has a wall mount member with a pair of angle irons arranged in a horizontal position attached to the wall with horizontal flanges projecting outwardly from the wall at different vertical heights. A plurality of rack members are mounted on the wall mount member and each has a vertical rod pivotal in a a pair of aligned holes in the flanges and a horizontal rail portion in the form of an angle iron turned with the apex projecting downwardly to define a channel to receive an edge of the wheel of the bicycle. A pair of angle braces extend upwardly and rearwardly from sides of the channel to a tab welded to the rod adjacent the top of the rod. A stop member in the channel prevents the wheel from moving forwardly.

8 Claims, 1 Drawing Sheet

BICYCLE DISPLAY RACK

This invention relates to a rack for mounting on a wall for displaying a plurality of bicycles.

BACKGROUND OF THE INVENTION

Bicycles, as is well known, are relatively cumbersome and difficult to store. In a retail situation where it is required to store and display a large number of bicycles, the problem is exacerbated so that the stored bicycles are difficult to present attractively to the retail customer. In some cases the bicycles simply stand in a row on the floor and is difficult for the customer to see the attractive features of each of the bicycles or to access the bicycle for a closer view. In other cases racks are provided which are raised from the floor and store the bicycles in a row at a raised height. Again it is difficult for the customer to access the particular bicycle of interest and to see its attractive features since it is difficult to get to a position alongside that bicycle without removing it from the rack.

SUMMARY OF THE INVENTION

It is one object of the present invention, therefore, to provide an improved rack by which bicycles can be stored in an attractive appearance and readily displayed for proper viewing of their features.

According to one aspect of the invention there is provided a rack for mounting on a wall for displaying a plurality of bicycles comprising a wall mount member having a first upper horizontal rail and a second lower horizontal rail each for mounting along the wall at a height spaced from the floor and a plurality of rack members each for receiving a respective one of the bicycles for display, the rails having pairs of holes each pair being aligned relative to and coaxial about a vertical axis with the axes spaced longitudinally along the rails, each rack member comprising a vertical post portion defining pin ends for projecting through a respective pair of the holes so that the post portion is supported on the rails and is maintained vertical for pivotal movement about the vertical axis, a horizontal rail portion attached to the post portion for pivotal movement therewith and projecting outwardly from the wall, the rail portion defining a channel for confining a bottom edge of the wheels of the bicycle, and a pair of angle braces each inclined from a point on the rail portion spaced from the post portion upwardly and toward the post portion with each angle brace on a respective side of the channel to hold the rail portion horizontal and to locate that wheel of the bicycle adjacent the post portion.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
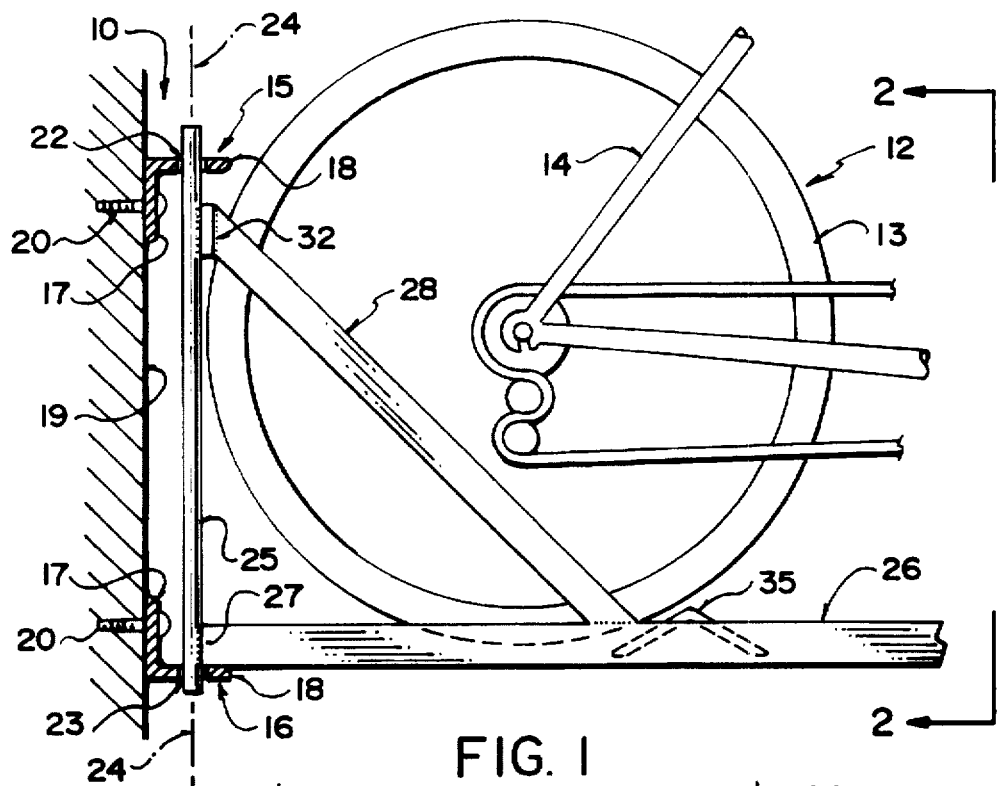
FIG. 1 is a vertical cross sectional view through a rack according to the present invention showing in side elevational view one of the rack members receiving a bicycle thereon.
Figure 2:
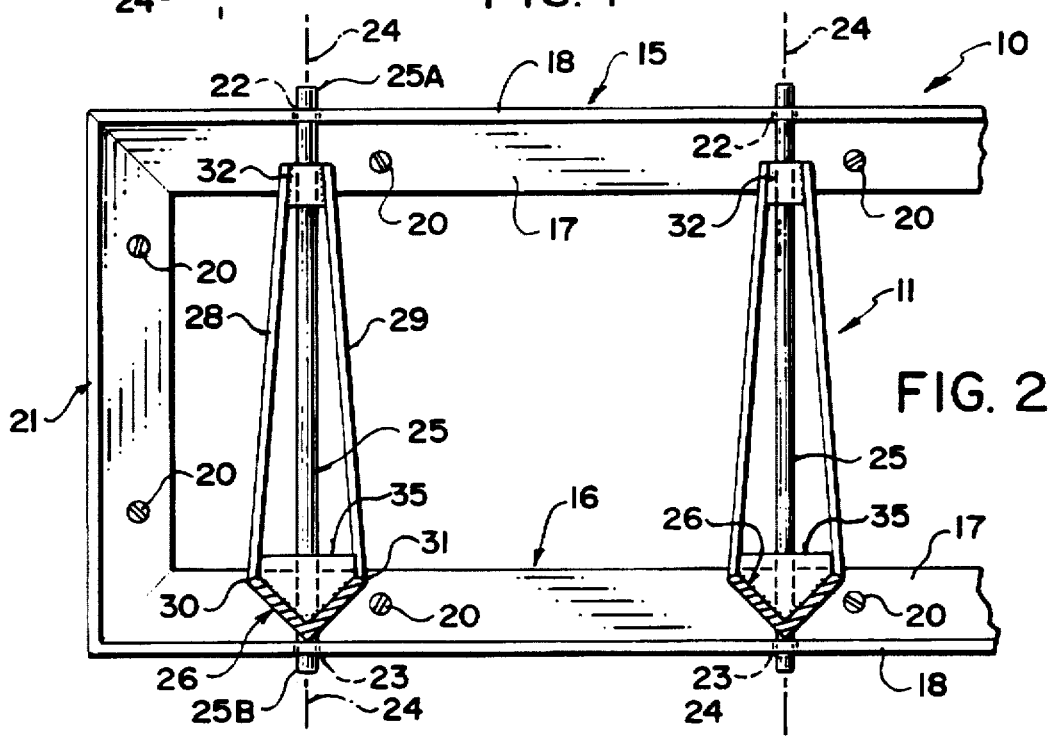
FIG. 2 is a cross sectional view along the lines 2—2 of FIG. 1 showing one end of the wall mount member and two of the plurality of rack members.

The rack for displaying a plurality of bicycles, particularly in a retail situation, is shown in FIGS. 1 and 2 and comprises a wall mount member 10 and a plurality of rack members 11 mounted on the wall mount member each for receiving and supporting a bicycle part of which is illustrated at 12. The bicycle is of course conventional so that only the rear wheel 13 and a part of the frame 14 is shown with the remainder of the bicycle being apparent to the person skilled in the art.

The wall mount member 10 comprises an upper horizontal rail 15 and a lower horizontal rail 16, each of which is formed by an angle iron so as to define a vertical flange 17 and a horizontal flange 18. The vertical flanges 17 are screwed to a wall 19 by screws 20 so as to support the horizontal flanges 18 in parallel spaced relationship, both of them being spaced from the floor. To form the rails into a rigid structure, the rails are interconnected by vertical connecting bars 21 which can also be formed as angle irons and screwed to the walls by screws 20.

The wall mount member therefore defines the pair of horizontal flanges 18 and these include a plurality of aligned holes 22 and 23. Thus each rack member is associated with a respective pair of the holes 22, 23 with those holes being aligned and coaxial about a vertical axis 24. The pairs of holes are spaced longitudinally of the rails by a distance which is preferably in the order of eighteen inches.

Each rack member comprises a vertical rod 25 of a diameter to fit through the holes 22 and 23. In the mounted position, therefore, the rod 25 extends through the holes 22, 23 and provides an upper pin portion 25A and lower pin portion 25B each projecting beyond the respective horizontal flange 18 so as to hold the rod in position along the axis 24 and pivotal about the axis 24. The rod 25 thus forms a vertical post portion mounted in the wall mount member.

The rack member further includes a horizontal rail portion 26 which defines a channel for receiving the bottom edge of both wheels of the bicycle 12. The channel is defined simply by an angle iron arranged with the apex downwardly to define a V-shape so that the wheel simply sits in the V channel and is prevented from side to side movement. An inner end 27 of the horizontal rail portion is welded to the rod 25.

The rack member further includes a pair of angle braces 28 and 29 which are connected to the horizontal rail portion at a position spaced away from the rod 25 and are inclined upwardly and rearwardly therefrom for attachment to the rod at a position adjacent the top of the rod. The angle braces 28 and 29 are welded to respective side edges 30 and 31 of the horizontal rail portion. The upper end of the angle braces is welded to a tab 32 which is in turn welded to the rod 25. The tab 32 is formed by a rectangular metal plate welded to the front side of the rod at a position just spaced downwardly from the rail 15. The width of the tab 32 is arranged so that the angle braces 28 and 29 as well as inclining upwardly and rearwardly also are inclined slightly inwardly so that their spacing reduces from the horizontal rail portion up to the tab. The spacing of the angle braces at the tab 32 is arranged relative to the width of the wheel 13 of the bicycle so as to prevent significant side to side movement of the bicycle at the tab 32.

The horizontal rail portion 26 sits on the upper surface of the flange 18 of the lower rail 16. The length of the lower pin portion 25B of the rod 25 projecting downwardly beyond the bottom edge of the horizontal rail portion 16 is sufficient to extend into and slightly through the flange 18 of the bottom rail 16 to hold the rod in place. However the length of the upper pin portion 25A which is the length of the lower pin portion 25B is slightly less than the distance between the flange 18 of the upper rail 15 and the tab 32 to allow the rack member to be lifted upwardly and the lower pin portion 25B of the rod removed from the bottom rail 16 to allow the rack member to be removed from the wall mount member.

In order to prevent the bicycle from moving away from the post portion defined by the rod 25, there is provided a raised stop 35 welded in the interior of the horizontal rail portion and as shown this is defined by a portion of angle iron with the apex extending upwardly and the edges cut into a V-shape so as to extend to the base of the channel defining the horizontal rail portion. The stop member 35 is spaced from the rod 25 by a distance to receive a conventional bicycle wheel.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A rack for mounting on a wall for displaying a plurality of bicycles comprising:

a substantially rectangular wall mount frame having a first upper horizontal rail, a second lower horizontal rail, each for mounting along the wall at a height spaced from the floor and a pair of vertical connecting members each arranged at respective aligned ends of the rails for connecting the rails to form a rigid structure, each rail comprising an angle member defining a first flat flange for lying flat against the wall and being fastened thereto by fasteners extending through holes in the flange and a second flange at right angles to the first flange so as to project outwardly from the wall at right angles to the wall such that the second flanges of the rails are aligned one above the other;

and a plurality of rack members each for receiving a respective one of the bicycles for display;

the rails having a plurality of mounting means therein each for receiving a respective one of the rack members, the mounting means consisting solely of a pair of aligned holes in each of the second flanges of the upper and lower rails, each pair being aligned relative to and coaxial about a vertical axis with the axes spaced longitudinally along the rails;

each rack member comprising:

a vertical post portion defining an upper pin end projecting through the hole in the flange of the upper rail and a lower pin projecting through the respective hole in the flange of the lower rail so that the post portion is supported on the rails and is maintained vertical for pivotal movement about the vertical axis;

the upper pin end being longer than the lower pin end such that the post portion can be lifted vertically to a position in which the upper pin projects through the hole in the second flange of the upper rail to release the lower pin end from the lower rail and such that the post portion when released can be readily removed from and replaced on the rails;

a horizontal rail portion attached to the post portion for pivotal movement therewith and projecting outwardly from the wall, the rail portion defining a channel for confining a bottom edge of the wheels of the bicycle;

and a pair of angle braces each inclined from a point on the rail portion spaced from the post portion upwardly and toward the post portion with each angle brace on a respective side of the channel to hold the rail portion horizontal and to locate that wheel of the bicycle adjacent the post portion.

2. The rack according to claim 1 wherein the post portion comprises a rod with the ends of the rod defining the pin ends.

3. The rack according to claim 1 wherein the rail portion comprises an angle iron shaped so as to define a V-shape in cross section with the apex of the V downwardly to define the channel for receiving and confining the wheels.

4. The rack according to claim 1 wherein the angle braces are also inclined toward one another such that the spacing therebetween decreases toward the post portion.

5. The rack according to claim 4 wherein the post portion comprises a rod and wherein there is provided a tab piece attached across the rod with each end of the tab piece spaced to a respective side of the rod, upper ends of each of the angle braces being welded to a respective one of the ends of the tab piece.

6. The rack according to claim 1 including a raised stop member mounted in the channel at a base of the channel and standing upwardly from the base of the channel at a position spaced from the post portion with the spacing sufficient to receive and confine said wheel.

7. A rack for mounting on a wall for displaying a plurality of bicycles comprising:

a wall mount member having a first upper horizontal rail and a second lower horizontal rail each for mounting along the wall at a height spaced from the floor;

and a plurality of rack members each for receiving a respective one of the bicycles for display;

the rails having pairs of holes each pair being aligned relative to and coaxial about a vertical axis with the axes spaced longitudinally along the rails;

each rack member comprising:

a vertical rod defining upper and lower rod ends for projecting through a respective pair of the holes so that the post portion is supported on the rails and is maintained vertical for pivotal movement about the vertical axis;

a tab piece attached across the rod adjacent to and below the upper rod end with each end of the tab piece spaced to a respective side of the rod;

a horizontal rail portion attached to the post portion for pivotal movement therewith and projecting outwardly from the wall, the rail portion comprising an angle iron shaped so as to define a V-shape in cross section with the apex of the V downwardly to define the channel for receiving and confining a bottom edge of the wheels of the bicycle;

and a pair of angle braces each formed from a straight bar with an upper end of each of the bars attached to the respective opposed end of the tab piece and inclined therefrom downwardly and outwardly, a lower end of each of the bars being attached to opposing points on the rail portion spaced from the post portion with each angle brace on a respective side of the channel to hold the rail portion horizontal and to locate the wheel of the bicycle adjacent the post portion, a width of the tab piece being less than a width of the rail portion such that the angle braces converge from the rail portion toward the tab piece;

and a raised stop member mounted in the channel at a base of the channel and standing upwardly from the base of the channel at a position spaced from the post portion with the spacing sufficient to receive and confine said wheel.

8. A rack for mounting on a wall for displaying a plurality of bicycles comprising:

a substantially rectangular wall mount frame having a first upper horizontal rail, a second lower horizontal rail, each for mounting along the wall at a height spaced from the floor and a pair of vertical connecting members each arranged at respective aligned ends of the rails for connecting the rails to form a rigid structure, each rail comprising an angle member defining a first flat flange for lying flat against the wall and being fastened thereto by fasteners extending through holes in the flange and a second flange at right angles to the first flange so as to project outwardly from the wall at right angles to the wall such that the second flanges of the rails are aligned one above the other;

and a plurality of rack members each for receiving a respective one of the bicycles for display;

the rails having a plurality of mounting means therein each for receiving a respective one of the rack members, the mounting means consisting solely of a pair of aligned holes in each of the second flanges of the upper and lower rails, each pair being aligned relative to and coaxial about a vertical axis with the axes spaced longitudinally along the rails;

each rack member comprising:

a vertical rod defining upper and lower rod ends for projecting through a respective pair of the holes so that the post portion is supported on the rails and is maintained vertical for pivotal movement about the vertical axis;

a tab piece attached across the rod adjacent to and below the upper rod end with each end of the tab piece spaced to a respective side of the rod;

the upper pin end being longer than the lower pin end such that the post portion can be lifted vertically to a position in which the upper pin projects through the hole in the second flange of the upper rail to release the lower pin end from the lower rail and such that the post portion when released can be readily removed from and replaced on the rails a horizontal rail portion attached to the post portion for pivotal movement therewith and projecting outwardly from the wall, the rail portion comprising an angle iron shaped so as to define a V-shape in cross section with the apex of the V downwardly to define the channel for receiving and confining a bottom edge of the wheels of the bicycle;

and a pair of angle braces each formed from a straight bar with an upper end of each of the bars attached to the respective opposed end of the tab piece and inclined therefrom downwardly and outwardly, a lower end of each of the bars being attached to opposing points on the rail portion spaced from the post portion with each angle brace on a respective side of the channel to hold the rail portion horizontal and to locate the wheel of the bicycle adjacent the post portion, a width of the tab piece being less than a width of the rail portion such that the angle braces converge from the rail portion toward the tab piece;

and a raised stop member mounted in the channel at a base of the channel and standing upwardly from the base of the channel at a position spaced from the post portion with the spacing sufficient to receive and confine said wheel.

* * * * *